April 25, 1961  J. W. HUGHES  2,981,425
LOADING DEVICE

Filed Aug. 8, 1958  2 Sheets-Sheet 1

INVENTOR:
JOHN WALLACE HUGHES
BY: *James Todorovic*
HIS ATTORNEY

April 25, 1961  J. W. HUGHES  2,981,425
LOADING DEVICE

Filed Aug. 8, 1958

INVENTOR:
JOHN WALLACE HUGHES
BY: *James Todorovic*
HIS ATTORNEY

United States Patent Office 2,981,425
Patented Apr. 25, 1961

2,981,425

LOADING DEVICE

John Wallace Hughes, Midland, Tex., assignor to Shell Oil Company, a corporation of Delaware Filed Aug. 8, 1958, Ser. No. 754,022

4 Claims. (Cl. 214—77)

This invention relates to pipe handling equipment and more particularly to an apparatus adapted to pick up lengths of long heavy pipe such as that used in oil field operations and load these pipe lengths on a truck or trailer.

This invention is an improvement over the loading apparatus disclosed in Patent 2,781,924 entitled, "Hydraulic Pipe Loading Apparatus For Vehicles" which is incorporated by reference. In the apparatus described in the above patent, a boom which is pivoted at one end to the side of the truck or trailer is adapted to pick a length of pipe up from the ground and elevate it so that it may be rolled off the boom onto the bed of the truck or trailer. While this apparatus is very useful in loading pipe it has the disadvantage in that the loading booms and the hydraulic cylinders used for raising and lowering the booms must be removed from the side of the truck or the trailer and stored after the loading operation is completed. In addition, it is necessary to disconnect the conduits from the hydraulic cylinders and store these conduits with the remainder of the equipment. The removal and storage of the loading booms and hydraulic equipment is an awkward and time-consuming operation and, thus, decreases the utility of the apparatus described in the above patent.

The above patent also has the disadvantage in that the bridge members which are attached to the loading booms to provide a simple and reliable means for leveling the top of the booms with the top of the load of the truck are adjusted manually between a plurality of fixed positions. These fixed positions do not always correspond to the desired positions of the bridge members and thus the loading mechanism disclosed is not entirely satisfactory.

Accordingly, it is the principal object of this invention to provide a loading apparatus for a vehicle in which all of the apparatus is stored inside the frame work of the vehicle when not in use.

A further object of this invention is to provide an apparatus for loading pipe on a vehicle utilizing boom members including a means for adjusting the angle between the bridge member and the boom member by means of pressurized fluid operated cylinders.

A still further object of this invention is to provide a pipe loading apparatus for a vehicle of the type in which booms are hinged to the side of the vehicle and raised and lowered by hydraulic cylinders with a simple means for storing the booms within the vehicle without requiring the hydraulic connections to be broken.

The above objects and other advantages are accomplished by providing a pipe loading apparatus which utilizes booms hinged to the side of a vehicle by means of removable hinge pins for lifting the pipe from a lower level up to the level of the vehicle bed. The booms are raised and lowered by means of hydraulic cylinders mounted on the vehicle while hydraulically operated bridge members are provided for leveling the top of the booms with the top of the load of the vehicle. When the loading operation is completed and it is desired to store the loading booms, the removable hinge pins at the ends of the booms are removed and the booms rolled into storage compartments built into the bed of the vehicle. Sufficient slack is provided in all of the hydraulic connections to allow the booms to be moved from a stored position to an operating position without requiring any of the connections to be broken.

The above advantage and objections of this invention will be more easily understood from the following detailed description of a preferred embodiment when taken in conjunction with the attached drawings in which.

Figure 2:
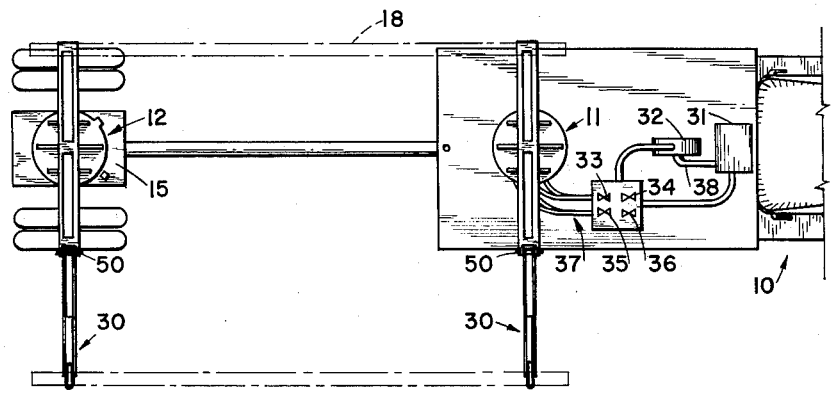
Figure 2 is a top view of the truck and trailer shown in Figure 1.
Figure 1:
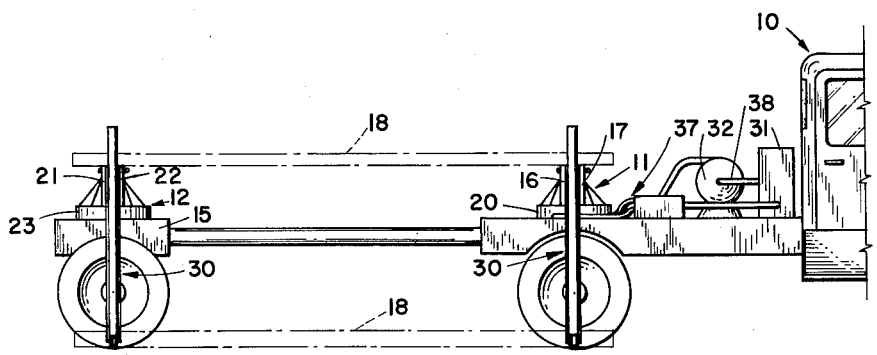
Figure 1 is a side view of a truck and trailer utilizing the pipe loading apparatus of this invention.
Figure 5:
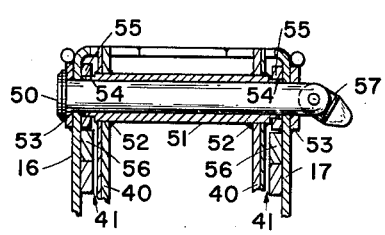
Figure 5 is a partial section taken along line 5—5 of Figure 4 and showing the removable hinge pin.

Referring now to Figures 1 and 2, there is shown a truck 10 having a trailer attached to its rear end. The truck is provided with a pivoted bolster member 11 which is positioned approximately over the rear wheels of the truck. Bolster member 11 may be of any well-known design which is adapted to support one end of a load of relatively long members, such as pipe, logs, utility poles or long timbers. The bolster 11 is provided with two spaced sides 16 and 17 which are attached to a base member 20 with the base member in turn being pivotally mounted on the bed of the truck. The sides of the bolster 11 are spaced in order to provide a storage compartment for the loading booms to be described below. A similar bolster 12 is pivotally mounted on the bed 15 of the trailer. The trailer bolster is also provided with two spaced side walls 21 and 22 which are secured to the bottom member 23 by any desired means such as welding or the like. The above truck and trailer arrangement is a well-known arrangement for use in transporting long lengths of rigid material such as pipe, logs, utility poles, lumber and the like, the only difference being the spaced side walls of the bolsters.

A length of pipe 18 is shown positioned on the two bolsters 11 and 12 while a second length of pipe 18 is shown positioned on the ends of two loading booms 30 which are pivotally attached or hinged at their opposite ends to one end of the bolsters 11 and 12 as will be described in detail below. The hydraulic cylinders 60 and 81 which are used for raising and lowering the booms 30 as well as positioning the bridge members are supplied with pressurized hydraulic fluid from a hydraulic pump 32 through control valves 33, 34, 35 and 36. A plurality of flexible conduits 37 are provided for connecting the control valves to the various hydraulic cylinders so that by positioning the proper valves one may raise or lower the booms or position the bridge members. A reservoir tank 31 is mounted on the truck and all of the hydraulic cylinders drain into the tank 31 by means of the conduits not shown, with the suction of pump 32 being connected to the tank by a conduit 38. While the hydraulic supply system is shown as mounted on the back of the truck, of course, any other source of hydraulic pressure may be used or other systems which are supplied as an integral part of the truck may also be used. Likewise, a separate hydraulic system could also be used but it is preferred to use a system which is mounted on the truck proper.

Referring now to Figures 3, 4, 5, and 6, which show the mechanism for raising and lowering each of the boom members 30 as well as the means for storing the boom members and their associated equipment in the storage compartments formed in the bolsters. While only the mechanism for the boom attached to the truck bolster 11 is shown the mechanism for the boom attached to the trailer bolster 12 is substantially the same. Each of the boom members 30 consists of a U-shaped outer frame 41 having stiffening members 40 attached to the legs 43 of the outer frame by suitable fastening means such as rivets or the like. The ends of the legs 43 of the U-shaped frame 41 terminate in curled edges 44 in order to add strength and rigidity to the boom members. The upper end of each of the booms 30 is hinged to the bolsters by a removable pin 50 which is shown as having a toggle means 57 for locking it in position. The pin 50 passes through a bushing member 51 which is fastened to the stiffening members 40 of the boom by any desired means such as annular welds 52. Circular plates 53 are welded to the side walls 16 and 17 of the bolster to provide additional support on the side walls of the bolster for the pin 50. The opposite ends of the bushing 51 are formed with a reduced diameter axle portion 54 for receiving the rollers 55 which engage two track members 56, fastened to the side walls 16 and 17 of the bolster, respectively. The use of the rollers 55 and track members 56 provides an easy means by which the booms may be rolled into the storage compartment inside the bolster as will be explained in greater detail below. The end of the track members 56 adjacent the pivot pin 50 are provided with a toggle portion 57 shown in Figure 3 in order to lower the top surface of the boom below the top of the bolster to permit the boom to be rolled into the storage compartment and still remain flush with the top of the bolster when withdrawn from the storage compartment.

Figure 6:
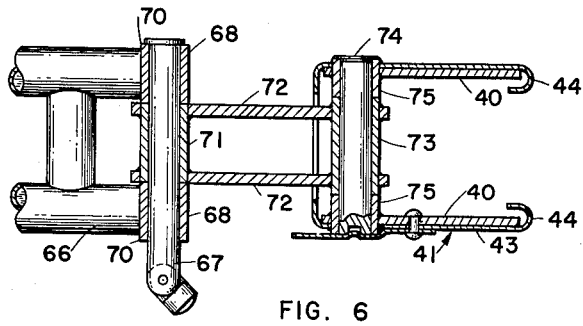
Figure 6 is a partial view taken along line 6—6 showing the connection between the hydraulic cylinder and the loading boom.
Figure 4:
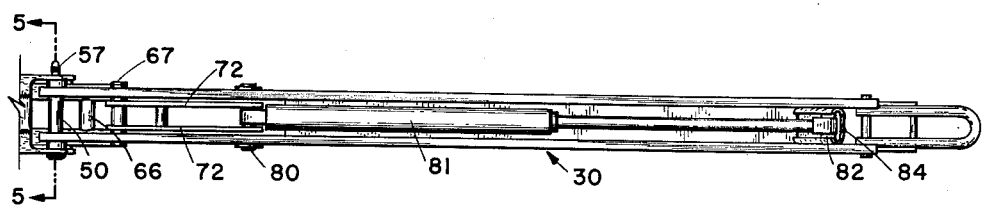
Figure 4 is a top view of the loading boom drawn to an enlarged scale.
Figure 3:
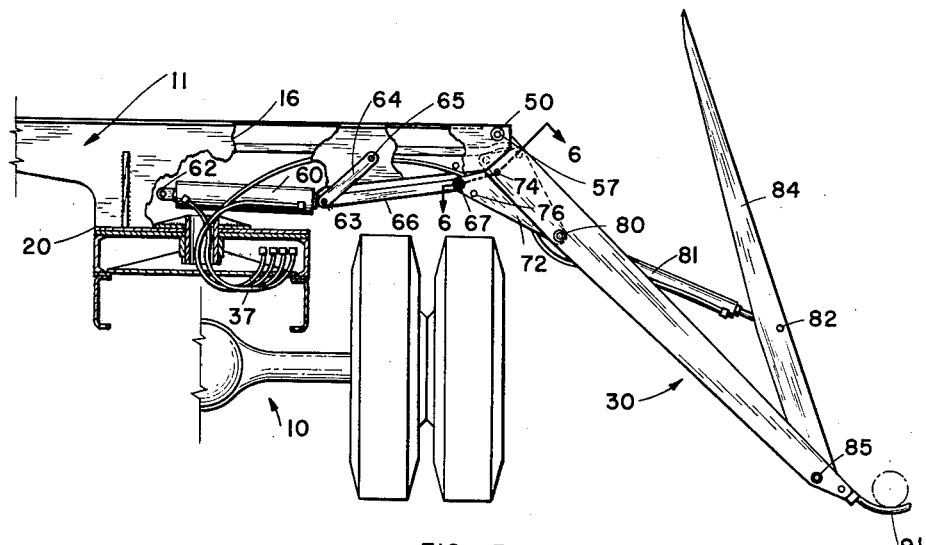
Figure 3 is a rear end view of the truck shown partially in section and with the loading mechanism resting on the ground.

The boom 30 is raised and lowered by means of a hydraulic cylinder 60 which is mounted on top of the bottom frame 20 as shown in Figure 3 by a hinge pin 62 which passes through the eye formed in the fixed end of the cylinder. The eye in the end of the piston rod of the cylinder 60 is connected to two idler links 64 and an actuating link 66 by means of a hinge pin 63. The opposite end of each of the idler links 64 is hinged to one of the side walls of the bolster by means of separate hinge pins 65 while the opposite end of the actuating link 66 is connected to two brackets 72 on the boom 30 by means of a removable hinge pin 67 as seen in Figure 6. The hinge pin 67 passes through two bushings 68 which are secured to the ends of the actuating link 66 by means of welds 70 or the like and a bushing 71 which is secured to both of the bracket members 72 by means of welding or the like. The brackets 72 are secured to the boom 30 by means of a removable pin 74 and a fixed pin 80 with the pin 74 passing through a bushing 73 which is secured to the brackets 72 and two bushings 75 which are secured to the side walls of the booms 30. The pin 80 passes through similar bushings in the bracket 72 and in the side walls of the boom members 30 not shown in the attached drawings.

The pin 74 is made removable in order to permit the storing of the brackets 72 within the booms by removing the pin 74 and rotating the brackets about the fixed pin 80 upwardly into the booms. The stored position of the brackets is shown by the dotted lines in Figure 3 and the brackets are held in this position by reinserting the pin 74 into the bushings 75 in the booms and holes 76 formed in the brackets. It is necessary to store the brackets within the booms in order for the brackets to clear the hinge pin 62 in the end of the hydraulic cylinder 60 when the booms are rolled into the bolsters as explained below.

Each of the booms 30 is provided with a bridge member 84 which is hinged at one end by means of a pin 85 so that the angle between the bridge member and the boom may be adjusted to bring the bridge member to the same level as the top of the load on the truck when the boom is raised. The angle between the boom 30 and the bridge member 84 is adjusted by means of a hydraulic cylinder 81 whose fixed end is secured to the boom by means of the pin 80 which passes through an eye formed on the fixed end of the cylinder. The piston rod of the cylinder 81 is connected to the bridge member 84 by means of a pin 82 which passes through the side walls of the bridge member and an eye formed in the end of the piston rod. The boom is completed by means of a curved spade 91 attached to its outer end which assists in holding the tubular members on the end of the boom as the boom is raised or lowered. The required connections between the hydraulic system and the hydraulic cylinders 60 and 81 are not shown or described in detail since these are well known to those skilled in the art of hydraulically operated equipment and may be easily made by means of flexible hoses or the like.

The mechanism of this invention is operated in substantially the same way as the mechanism described in the above referenced patent. When it is desired to load pipe or similar members with the above equipment it is first necessary to withdraw the booms 30 from their storage compartments and install the removable pins 50. The hydraulic cylinders 60 are then connected to the booms by installing the removable pins 67. Finally, the angle between the bridge members 84 and the booms is adjusted by means of the hydraulic cylinder 81 to bring the level of the bridge member level with any pre-existing load on the truck. The pipe is then loaded by lowering the booms into contact with the ground or other platform on which the pipe is stored and then rolling a section of pipe onto the spades 91 of the booms. Next both booms are raised simultaneously by opening the proper control valves to admit hydraulic fluid to the cylinders 60 until the booms are elevated sufficiently to permit the pipe to roll onto the truck. The remaining sections of pipe are loaded in the same manner except that the angle between the boom and the bridge member is adjusted after each layer of pipe is loaded to bring the bridge member level with the top of the load.

After the loading operation is completed the booms are stored in the bolsters 11 and 12 by first lowering the bridge members 84 into the space between the legs of the U-shaped boom members 41. This can easily be done by applying hydraulic pressure to the correct end of the cylinders 81 while venting it from the opposite end of the cylinders. After the bridge members are lowered into position the actuating link 66 is disconnected from the bracket 72 by removing the pin 67 and the brackets 72 stored within the booms by removing the pins 74. The pins 50 are then removed and the booms rolled into the bolster utilizing the rollers 55 and the tracks 56. After the boom members have been stored in the bolsters the actuating link 66 is held in a position free of the remainder of the truck or trailer in in the bolster by inserting hinge pin 67 through holes in the bolster sides 16–17 and the end of the actuating link 66.

From the above description it will be appreciated that this invention has provided a relatively simple means for storing the loading booms directly in the truck or trailer bolsters which only requires the removal of pins 60, 67 and 74. Sufficient slack is provided in the hydraulic conduits between the source of hydraulic pressure and the actuating cylinders 60 and 81, so that it is not necessary to disconnect these conduits and reconnect them each time the booms are used. The use of a hydraulic cylinder 81 to position the bridge members 84 provides a wide range of adjustment for the bridge member while also eliminating the manual adjustment of the bridge members required in the former device. This greatly increases the utility of the loading booms and speeds the loading operation by eliminating much time consuming manual labor. Since the hydraulic conduits are permanently installed on the truck they may be made more durable which will decrease the number of leaks and need for constant attention to this portion of the system.

Accordingly this invention should not be limited to the specific details described above by way of illustration but only to its broad spirit and scope as many modifications will occur to those skilled in the art within its broad spirit and scope.

I claim as my invention:

1. Apparatus for transferring a load of elongated members from a lower level onto the bed of a vehicle at a higher level comprising: a pair of storage compartments having spaced side walls and disposed below the level of the bed of the vehicle, the axis of said storage compartments being at an angle to the longitudinal axis of the vehicle bed; a pair of loading booms having a U-shaped cross-section and a length greater than the height of the vehicle bed, each of said booms being hinged at one end to one end of one of said storage compartments, respectively, by means of a first removable pin; rollers mounted on the legs of each of said booms; track means mounted on the spaced side walls of each of said storage compartments and disposed to engage the rollers on said boom; and a hydraulic cylinder for each boom having one end pivotally secured to the side walls of the storage compartment and the other end secured to the boom member by a second removable pin whereby said booms may be stored in said storage compartments by removing said first and second pins.

2. Apparatus for transferring elongated members from a lower level to the bed of a vehicle at a higher level comprising: at least one boom having a length greater than the height of the bed of the vehicle; a storage compartment having spaced side walls for each of said booms, said storage compartments being secured to the vehicle below the level of the bed with said side walls disposed at an angle to the bed and at an angle to the longitudinal axis of the vehicle; each of said booms being pivotally secured at one end by a first removable pin which passes through the spaced side walls of the storage compartment; rollers secured to each of said booms adjacent said one end; track means secured to said spaced side walls and disposed to engage said rollers; a fluid pressure actuator pivotally secured at one end by a second removable pin to said boom and secured by a fixed pin at the other end whereby said boom may be raised and lowered and stored in said storage compartment by removing said first and second pins.

3. Apparatus for transferring elongated members from a lower level to the bed of a vehicle at a higher level comprising: at least one boom having a U-shaped cross-section and a length greater than the height of the bed of the vehicle, said boom being pivotally attached to said vehicle at one end by a hinge having a removable pin member; a first fluid pressure means for raising and lowering said boom; a storage compartment formed on said vehicle for receiving said boom upon removal of the pin member, a bridge member pivotally secured at one end to the other end of said boom member, the other end of said bridge member being disposed adjacent said vehicle; said bridge member in addition being retractable into the open side of the boom to permit storage of said boom, a second fluid pressure means pivotally secured at one end to said boom and pivotally secured at the other end to said bridge member to permit adjustment of the angle between said boom and said bridge member.

4. Apparatus for transferring elongated members from a lower level to the bed of a vehicle at a higher level comprising: at least two spaced bolsters disposed on said vehicle transversely to the fore and aft axis of the vehicle for supporting the elongated members, said bolsters having spaced side walls for forming a storage compartment; a pair of booms having a U-shaped cross-section, one of said booms being hinged at one end of each bolster, said hinge having a removable hinge pin; track means secured to the side walls of said bolsters; rollers mounted on the legs of said booms and disposed to engage said track means; a first hydraulic cylinder for each boom, said first hydraulic cylinder being hinged to said vehicle at one end, the other end of said first hydraulic cylinder being connected to said booms by means of a removable pin; a bridge member for each boom, said bridge members being hinged at one end to the other end of said booms, the free end of said bridge member terminating adjacent the hinged end of said booms, said bridge members in addition being retractable into the open side of said boom member; a second hydraulic cylinder for each boom, said second hydraulic cylinder being hinged at one end to said boom, the other end of said second hydraulic cylinder being hinged to said bridge member whereby the angle between said bridge member and said boom can be adjusted.

References Cited in the file of this patent
UNITED STATES PATENTS

| | | |
|---|---|---|
| 2,740,538 | Felkner | Apr. 3, 1956 |
| 2,781,924 | Hughes | Feb. 19, 1957 |